May 22, 1951 — C. S. KELLEY — 2,553,824
BRAKE HEAD AND SHOE MECHANISM
Filed Aug. 26, 1948
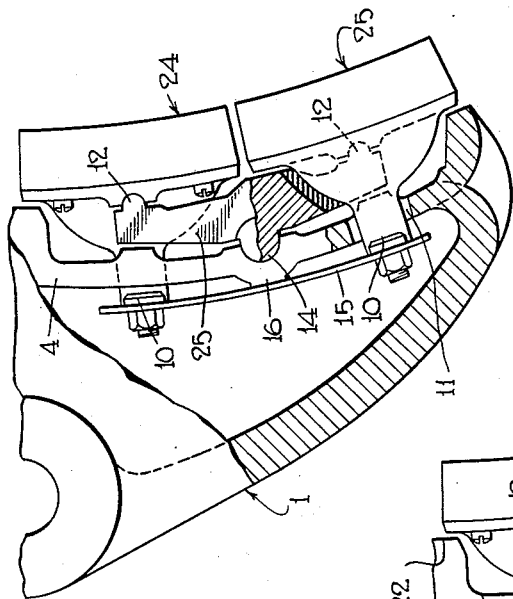
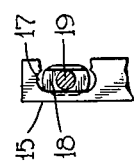
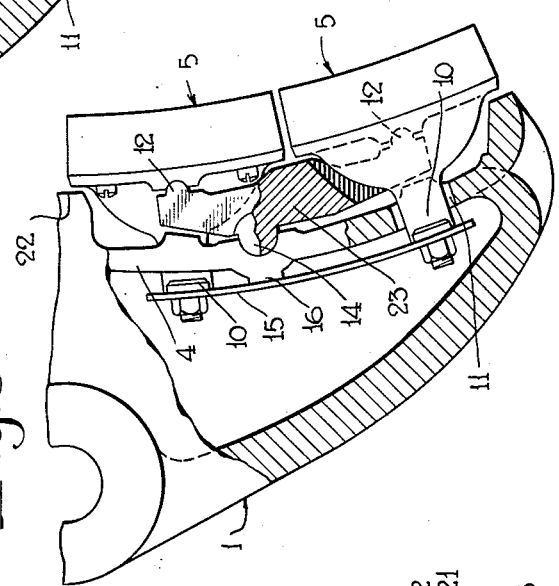
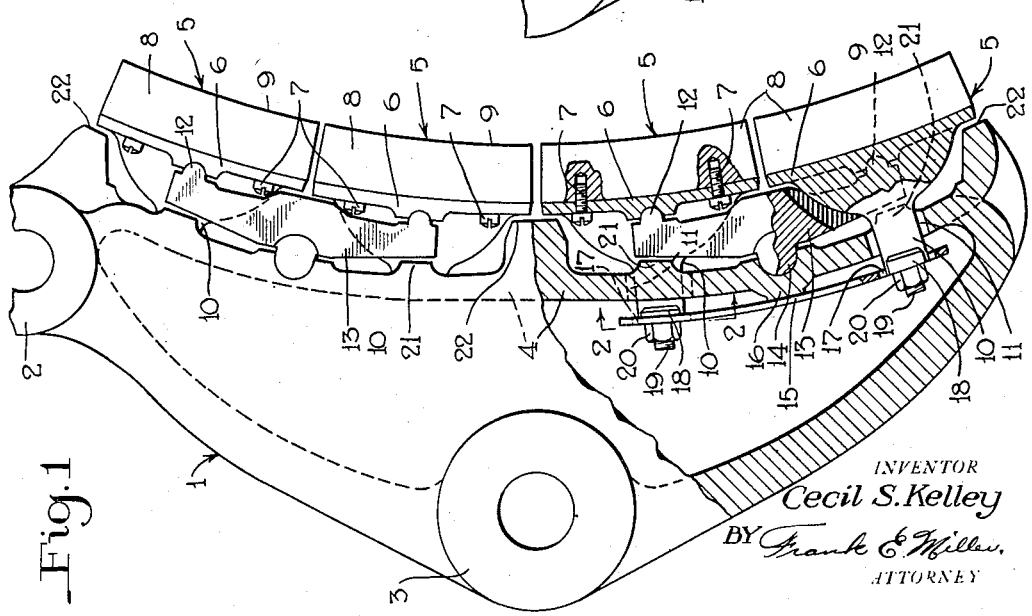
INVENTOR
Cecil S. Kelley
BY Frank E. Miller
ATTORNEY Patented May 22, 1951

2,553,824

UNITED STATES PATENT OFFICE 2,553,824

BRAKE HEAD AND SHOE MECHANISM

Cecil S. Kelley, Forest Hills, Pa., assignor to The Westinghouse Air Brake Company, Wilmerding, Pa., a corporation of Pennsylvania Application August 26, 1948, Serial No. 46,281

6 Claims. (Cl. 188—240)

This invention relates to friction brake structures for railway vehicles and more particularly to the type embodying a brake head and a plurality of brake shoes carried thereby for frictionally engaging the tread of a wheel or the like for braking same.

The standard brake shoe in general use for frictional braking engagement with the tread of a wheel of a railway vehicle is of considerable length and necessarily relatively narrow for properly engaging the wheel tread. When such a shoe is new the friction surface thereof is substantially concentric with the wheel tread but it has been found that during braking heating of the shoe causes warping thereof reducing the area of contact with the wheel tread and increasing the unit pressure of the shoe against the tread to an extent which at times results in melting away the shoe metal and hence excessive wear. Moreover it is known that after repeated brake applications the heating and cooling of the shoe results in permanent deformation with destruction of the concentricity of the friction surface with respect to the wheel tread with the results above mentioned. This is of course very objectionable in that it impairs the effectiveness of the brake shoe. Moreover all of the brake shoes on a vehicle will not distort in exactly the same manner so that they will affect uneven braking of the several wheels of a vehicle.

One object of the invention is therefore to provide a novel brake head and brake shoe arrangement which when employed with each wheel of a vehicle will effectively minimize the above mentioned objectionable features.

According to this object, a plurality of relatively short brake shoes are associated with a brake head in such a manner that, when brought into frictional braking contact with a wheel tread, they will automatically adjust themselves relative to the head and to each other to bring their braking surfaces into concentric relation with the wheel and thus provide maximum braking for any given pressure applied thereto. It is of course recognized that a relatively small brake shoe will also distort, but due to its size the distortion will be less, and if the shoe is sufficiently small, as in accordance with the invention, the effect of the distortion will be substantially negligible insofar as braking is concerned.

Another object of the invention is to provide a brake head carrying a plurality of brake shoes and lever means operative to transmit and divide, either equally or unequally, power from the brake head to the plurality of shoes.

According to the last mentioned object braking force applied to the brake head will be divided by the lever means among the plurality of brake shoes, equally or in any other proportion, as desired, according to whether the brake shoes are made of the same material, different materials or whether the brake shoes may be of different sizes, as will hereinafter be more fully described.

Other objects and advantages will become apparent from the following more detailed description of the invention.

In the accompanying drawing; Fig. 1 is a side elevational view of a brake structure, with parts broken away, embodying one form of the invention; Fig. 2 is a sectional view taken on the line 2—2 in Fig. 1; and Figs. 3 and 4 are partial views of a brake structure similar to that shown in Fig. 1 but of two other embodiments of the invention.

Description—Fig. 1

As shown in the drawing, 1 designates a brake head having the usual support boss 2 at its upper end for connection with a hanger (not shown) to support said head in braking relation with a vehicle wheel (not shown) and having at one side the usual boss 3 for connection with a brake beam or the like for operating said head to apply brakes.

Opposite the boss 3 the head is provided with a generally concave shaped web 4 extending in the direction of the length of the head, and spaced along this web longitudinally thereof are a plurality of pairs of separate brake shoes 5 arranged in spaced apart end to end relation. Although only a single row of end to end shoes 5 are shown in the drawing, the invention contemplates one, two or more such rows arranged parallel to each other transversely of the brake head 1, if such is desired.

Each brake shoe 5 comprises a rigid backing plate 6 to the outer face of which is secured by screws 7 a brake block 8 having a concave outer face 9 for frictional braking contact with the tread of a wheel. The brake blocks on each or both shoes 5 of each pair may be made of the same braking material or, if desired, of different braking materials having different friction or braking characteristics for different shoe temperatures, for different unit braking forces applied thereto and for different speeds of rubbing contact between the shoes and the tread of a wheel or other member to be braked, and the shoes of different braking materials may be arranged in any desired relation with respect to each other. Projecting from the face of each backing plate 6 opposite the brake block 8 and centrally of said face longitudinally thereof, is a boss 10 which loosely extends through an opening 11 in the brake head web 4. At both sides of the boss 10 and midway between the ends of the brake shoe the backing plate 6 is provided with aligned semi-cylindrical recesses extending transversely of the brake shoe, and rockably bearing in these recesses are similarly shaped aligned ribs 12 provided at one bifurcated end of an equalizing lever 13, the two prongs of the lever being disposed one at either side of the boss 10. Midway between its ends the lever 13 is provided on the side opposite the brake shoes 5 with a semi-cylindrical rib 14 extending transversely thereof, and thus parallel to the ribs 12 on the backing plate 6, and this rib 14 is rockably mounted in a similarly shaped recess provided in web 4 transversely of the brake head 1.

It will be seen that since the bearing connections between the lever 13, the shoes 5 and the brake head 1 are semi-cylindrical, they are open to permit ready assembly of said shoes and lever to said head and disassembly therefrom and which therefore necessitates restraining means to hold said shoes and lever to said head, as will now be described.

Within the brake head 1, i. e., at the side of web 4 opposite the brake shoes 5, the bosses 10 of the pair of brake shoes adjacent each end of said head are connected to opposite ends of restraining means in the form of a leaf spring 15 supported between its ends on a flat surface of a raised part 16 of said web, said raised part being directly opposite the recess in which the lever rib 14 is disposed and midway between the ends of the spring in the present embodiment of the invention. Each of the opposite ends of spring 15 is provided with a relatively long narrow slot 17 extending lengthwise of the spring and loosely fitted over a generally rectangular shaped, reduced portion 18 of the adjacent backing plate boss 10. Projecting from the portion 18 of each boss is a screw-threaded portion 19 on which is secured a nut 20 engaging the spring 15 at opposite sides of the respective slot 17. The spring 15 is under stress and therefore effective through the nuts 20 engaging its opposite ends to hold the brake shoes 5 and lever 13 in assembled relation to the brake head web 4.

It will be apparent that engagement of spring 15 with the flat surface of raised part 16 of web 4 will, when the brake block is in a released position, act to support the connected pair of brake shoes 5 and lever 13 in the position in which they are shown in the drawing with respect to the brake head 1.

When braking power is applied to boss 3 of the brake head 1 to press the several brake shoes 5 against the tread of a wheel for braking same it will be noted that such power will be equally divided between the two levers 13 and the power applied to each of said levers will be equally divided between the connected pair of brake shoes 5. During such operation the brake shoes 5 will individually adjust themselves to the tread of the wheel due to their rocking connection with the lever 13, and if the brake block 8 of one brake shoe of a pair wears more rapidly than the other the connecting lever 13 and spring 15 will rock at their connections with the brake head web 4 to compensate for such wear and maintain equal the braking action of the two shoes 5.

The web 4 is provided with lugs 21 arranged for contact by the ends of each lever 13, in case of breakage of said lever, to support the central portion of the respective brake shoes 5, the opposite ends of which will, under this condition, be supported by contact with lugs 22 projecting from web 4 while the adjacent ends will be supported by contact with the adjacent central portion of said lever, whereby the brake structure will still be capable of braking a wheel but its action will be like the well-known standard single shoe structure since the several brake shoes 5 will be rigid with respect to the brake head, during braking action.

*Description—Fig. 3*

If it is desired that the brake blocks of each pair of brake shoes be made of different braking materials as a consequence of which it is desired to apply different pressures to said brake shoes, a lever 23 having unequal lever arms, as shown in Fig. 3 of the drawing, may be provided to properly divide between the two shoes the braking power applied by the brake head 1 to said shoes.

In this embodiment the raised part 16 of web 4 supporting the spring 15 is directly over the rib 14 on lever 23 as in the structure shown in Fig. 1, but closer to the boss 10 of the shoe 5 engaged by the shorter arm of lever 21 in order to equalize the turning effect of said spring on opposite ends of said lever to permit said spring to normally hold the two brake shoes 5 in the position in which they are shown in the drawing with respect to the brake head 1. Otherwise this structure may be like that shown in Fig. 1 of the drawing.

*Description—Fig. 4*

On the other hand it may be desirable to employ brake shoes 24 and 25a in each pair having different areas for contact with the tread of the wheel, as shown in Fig. 4. If it is desired that these shoes exert different unit pressures against the tread of the wheel, they may be connected by a lever 25 having lever arms of equal length as shown in Fig. 4 of the drawing. Otherwise this structure may also be like that shown in Fig. 1.

*Summary*

It will now be seen that I have provided an improved brake structure embodying a brake head and a plurality of individual brake shoes thereon arranged in end to end relation with respect to the length of the brake head. The brake shoes may have equal or different areas for frictional braking contact with the tread of a wheel or the like and may be made of different materials, and braking force applied to the head may be equally or unequally distributed between the plurality of brake shoes as required to obtain a desired braking characteristic.

Having now described the invention, what I claim as new and desire to secure by Letters Patent, is:

1. In combination, a brake head, a pair of brake shoes arranged in spaced apart end to end relation longitudinally of said head and each having midway of its ends and on the side opposite its braking face a substantially semi-cylindrical recess extending transversely of the shoe and head, and said head having a substantially semi-cylindrical recess extending transversely thereof, and a lever interposed between said shoes and head having at its ends substantially semi-cylindrical fulcrum ribs bearing against said shoes in the said recesses therein and having an oppositely arranged substantially semi-cylindrical fulcrum rib bearing against said head in the said recess therein and spring means carried by said head and connected under stress to said shoes for holding said lever and shoes in cooperative relation with, respectively, said head and lever.

2. In combination, a brake head, a pair of brake shoes arranged in spaced apart end to end relation longitudinally of said head, a lever interposed between said head and shoes having at its ends open fulcrum bearing connections with said shoes and having intermediate its ends an oppositely arranged open fulcrum bearing connection with said head, spring means carried by said head, and means connecting said spring means to said shoes and stressing said spring means for holding said shoes and lever in cooperative relation with each other and said head.

3. In combination, a brake head, a pair of brake shoes arranged in spaced apart end to end relation longitudinally of said head, a lever interposed between said head and shoes having at its ends fulcrum bearing connections with said shoes and having intermediate its ends an oppositely arranged fulcrum bearing connection with said head, stressed spring means carried by said head connected to said shoes, and means associated with said head and cooperative with said spring means for urging said shoes to a chosen position with respect to said head.

4. In combination, a brake head, a pair of brake shoes arranged in spaced apart end to end relation longitudinally of said head, a lever interposed between said head and shoes having at its ends fulcrum bearing connections with said shoes and having intermediate its ends an oppositely arranged fulcrum bearing connection with said head, said head having a flat surface arranged opposite to the portion engaged by said lever, a stressed leaf spring engaging intermediate its ends said surface, and means connecting the ends of said spring to said shoes.

5. In combination, a brake head comprising a web of generally concave shape in the direction of the length of the head, a pair of friction brake shoes arranged in spaced apart end to end relation longitudinally of said web, each brake shoe comprising a portion loosely extending through an opening in said web, a lever interposed between said shoes and web having a fulcrum connection at its ends with said shoes and an oppositely arranged fulcrum connection between its ends with said web, a stressed leaf spring at the side of said web opposite said shoes operatively connected at its ends to said extending portions of said shoes, and a flat bearing surface on said web engaged by and supporting said spring intermediate its ends.

6. In combination, a brake head comprising a web of generally concave shape in the direction of the length of the head, a pair of friction brake shoes arranged in spaced apart end to end relation longitudinally of said web, each brake shoe comprising a central portion extending from the side opposite the braking face thereof loosely through an opening in said web, a lever interposed between said shoes and web having transversely of said head a fulcrum connection with said web and comprising at each end two prongs straddling the extending portion of one of said shoes and each prong having a fulcrum connection with the respective shoe arranged parallel to the first named fulcrum connection and spring means supported on said head acting on the central extending portions of both shoes for holding said shoes and lever assembled to said head.

CECIL S. KELLEY.

REFERENCES CITED

The following references are of record in the file of this patent:

UNITED STATES PATENTS

| Number | Name | Date |
|---|---|---|
| 979,623 | Williams | Dec. 27, 1910 |
| 1,979,644 | Saito | Nov. 6, 1934 |
| 2,095,427 | Williams | Oct. 12, 1937 |
| 2,168,845 | Nicolet | Aug. 8, 1939 |
| 2,172,565 | Mitchell | Sept. 12, 1939 |

FOREIGN PATENTS

| Number | Country | Date |
|---|---|---|
| 442,236 | Great Britain | Feb. 5, 1936 |
| 649,486 | Germany | Aug. 12, 1937 |